United States Patent
Bluestone et al.

(10) Patent No.: US 11,315,098 B2
(45) Date of Patent: Apr. 26, 2022

(54) SYSTEM AND METHOD FOR GROUP PAYMENTS

(71) Applicant: PayPal, Inc., San Jose, CA (US)

(72) Inventors: Deborah Bluestone, San Jose, CA (US); Saloni Pujara, San Jose, CA (US); Brielle Harrison, San Jose, CA (US)

(73) Assignee: PAYPAL, INC., San Jose, CA (US)

( * ) Notice: Subject to any disclaimer, the term of this patent is extended or adjusted under 35 U.S.C. 154(b) by 223 days.

(21) Appl. No.: 16/430,721

(22) Filed: Jun. 4, 2019

(65) Prior Publication Data
US 2020/0387884 A1    Dec. 10, 2020

(51) Int. Cl.
G06Q 20/22 (2012.01)
G06Q 20/14 (2012.01)
G06Q 30/04 (2012.01)

(52) U.S. Cl.
CPC ............ *G06Q 20/29* (2013.01); *G06Q 20/14* (2013.01); *G06Q 30/04* (2013.01)

(58) Field of Classification Search
CPC combination set(s) only.
See application file for complete search history.

(56) References Cited

U.S. PATENT DOCUMENTS

| | | | | |
|---|---|---|---|---|
| 7,076,465 | B1 * | 7/2006 | Blagg | G06Q 20/10 705/35 |
| 7,398,252 | B2 * | 7/2008 | Neofytides | G06Q 20/02 283/58 |
| 7,734,545 | B1 * | 6/2010 | Fogliano | G06Q 40/02 705/40 |
| 7,797,173 | B1 * | 9/2010 | Polilli | G06Q 40/08 705/4 |
| 8,401,968 | B1 * | 3/2013 | Schattauer | G06Q 20/40 705/44 |
| 9,355,394 | B2 * | 5/2016 | Gupta | G06Q 20/14 |
| 9,710,801 | B2 * | 7/2017 | Aadi | G06Q 20/14 |
| 9,875,469 | B1 * | 1/2018 | Chin | G06Q 20/3276 |
| 9,990,621 | B1 * | 6/2018 | Ng | G06Q 20/202 |
| 10,242,351 | B1 * | 3/2019 | Wilson | G06Q 20/367 |
| 10,679,207 | B1 * | 6/2020 | Huffines | G06Q 20/3278 |
| 2006/0178130 | A1 * | 8/2006 | Makrygiannis | G06Q 20/322 455/406 |
| 2006/0224470 | A1 * | 10/2006 | Garcia Ruano | G06Q 20/102 705/26.1 |
| 2010/0078472 | A1 * | 4/2010 | Lin | G06Q 40/02 235/379 |

(Continued)

*Primary Examiner* — Peter Ludwig
(74) *Attorney, Agent, or Firm* — Haynes and Boone, LLP (57) ABSTRACT

Based on detecting a selection, by a first user, of a group payment option on a merchant interface, the computer system launches a user selection user interface that includes one or more user selection interface elements that correspond to one or more users associated with the first user. Based on detecting a selection of one or users, the computer system launches a group payment user interface that includes one or more payment allocation user interface elements that corresponds to a payment allocation for the selected users. Based on detecting a confirmation of a first payment allocation plan, the computer system processes a payment for the purchase and further transmits invoices to the selected users which include an allocated payment amount.

20 Claims, 8 Drawing Sheets

(56) References Cited

U.S. PATENT DOCUMENTS

| | | | |
|---|---|---|---|
| 2010/0121745 A1* | 5/2010 | Teckchandani | G06Q 20/10 705/30 |
| 2010/0332386 A1* | 12/2010 | Vancini | G06Q 30/04 705/40 |
| 2011/0106601 A1* | 5/2011 | Perlman | G06Q 40/02 705/14.14 |
| 2011/0313897 A1* | 12/2011 | Mulakaluri | G06Q 40/02 705/30 |
| 2012/0166332 A1* | 6/2012 | Naaman | G06Q 20/3278 705/40 |
| 2012/0173396 A1* | 7/2012 | Melby | G06Q 30/04 705/34 |
| 2013/0041824 A1* | 2/2013 | Gupta | G06Q 40/00 705/44 |
| 2013/0151357 A1* | 6/2013 | Havas | G06Q 50/12 705/15 |
| 2013/0290186 A1* | 10/2013 | Esch | G06Q 30/0613 705/44 |
| 2014/0012608 A1* | 1/2014 | Hecht | G06Q 50/01 705/5 |
| 2014/0180929 A1* | 6/2014 | Ohnishi | G06Q 20/102 705/64 |
| 2014/0201067 A1* | 7/2014 | Lai | G06Q 20/29 705/39 |
| 2014/0330654 A1* | 11/2014 | Turney | G06Q 20/3224 705/15 |
| 2015/0127526 A1* | 5/2015 | Ye | G06Q 40/02 705/39 |
| 2015/0302384 A1* | 10/2015 | Aadi | G06Q 20/14 705/40 |
| 2016/0042328 A1* | 2/2016 | Teckchandani | G06Q 20/102 705/44 |
| 2016/0071139 A1* | 3/2016 | Esch | G06Q 20/12 705/14.23 |
| 2016/0117651 A1* | 4/2016 | Davis | G06Q 20/386 705/40 |
| 2017/0161697 A1* | 6/2017 | Clark | G06Q 20/32 |
| 2017/0185989 A1* | 6/2017 | Bozovich, Jr. | G06Q 20/227 |
| 2017/0286941 A1* | 10/2017 | Aadi | G06Q 20/14 |
| 2018/0357628 A1* | 12/2018 | Vergari | G06Q 20/29 |
| 2019/0019172 A1* | 1/2019 | Clark | G06Q 20/102 |
| 2019/0139010 A1* | 5/2019 | Clark | G06Q 20/32 |
| 2019/0311339 A1* | 10/2019 | Nguyen | G06Q 20/10 |
| 2020/0074520 A1* | 3/2020 | Bermudez | G06Q 20/26 |
| 2020/0226655 A1* | 7/2020 | Bermudez | G06Q 20/102 |
| 2020/0334658 A1* | 10/2020 | Aadi | G06Q 20/14 |

* cited by examiner

XYZ TICKET SALES

Check Out

First Name

Last Name

Address

Phone Number

PURCHASE DETAILS

Skinny Puppet Ticket x 5
$100.00

SUBTOTAL $100.00

TAX 10% $10.00

TOTAL $110.00

RETURN TO CART

402 — GROUP PAYMENT

404 — PAYMENT OPTION 2

PAYMENT OPTION 3

SYSTEM AND METHOD FOR GROUP PAYMENTS

TECHNICAL FIELD

The present disclosure relates to group payments, and more particularly to a system and method for facilitating group payments.

BACKGROUND

The payments landscape has changed drastically over the past decade. This is primarily due to fintech companies that have allowed consumers to have simple and frictionless shopping experiences online, while also allowing consumers to transfer money to their family and friends via their computers and mobile devices. Furthermore, fintech companies have also provided users with an avenue to send invoices to other users and also to keep track of their transactions. However, as the digital payments landscape continues to evolve, there remains a need for a system that allows for easy and frictionless group payments.

DETAILED DESCRIPTION

Embodiments of the present disclosure provide a system, method, and program product. In response to detecting a selection, by a first user, of a first payment user interface element displayed on a merchant interface corresponding to a purchase, a computer system launches a user selection user interface, wherein the user selection user interface corresponds to a payment service provider, and wherein the first payment user interface includes one or more user selection interface elements that correspond to one or more users associated with the first user. In response to detecting a selection of at least a first user selection interface element of the one or more user selection interface elements, the computer system launches a group payment user interface, wherein the group payment user interface includes one or more payment allocation user interface elements that corresponds to a payment allocation for a portion of one or more users that correspond to the selected at least the first user selection interface element. In response to detecting a confirmation of a first payment allocation plan for the portion of the one or more users that correspond to the selected at least the first user selection interface element, the computer system processes a payment for the purchase, wherein the processing the payment for the purchase includes transmitting one or more invoices to the portion of the one or more users that correspond to the selected at least the first user selection interface element, wherein a payment allocation corresponding to each invoice of the one or more invoices corresponds to the first payment allocation plan.

In the example embodiment, the present disclosure describes a solution that describes providing a group payment interface that allows a user to initiate and carry out a frictionless group purchase. In the example, embodiment, a group payment interface element may be provided on a merchant website, which upon selection, causes a payment service provider to launch a group payment user selection user interface. Within the group payment user selection user interface, a user is able to select one or more other users (other users of the payment service provider) to associated with the group purchase. Furthermore, in one or more embodiments, the group payment user selection user interface may provide one or more user interface elements that corresponds to a group of preset users and may also provide one or more user interface elements that correspond to a group of users predicted to correspond to the group purchase. Upon selection of the other users to associate with the group purchase, the payment service provider may launch a group payment interface that allows the user to allocate an appropriate portion of the group purchase amount to each of the selected users. Furthermore, the payment service provider may analyze previous transactional activity and apply any outstanding payments to the current allocation scheme, and based on this, provide a suggested allocation amount for each of the selected users. Upon confirmation of the payment allocation scheme, the payment service provider may automatically transmit invoices to each of the selected users (which may include a corresponding allocated payment amount).

Embodiments of the present disclosure will now be described in detail with reference to the accompanying Figures.

Figure 1:
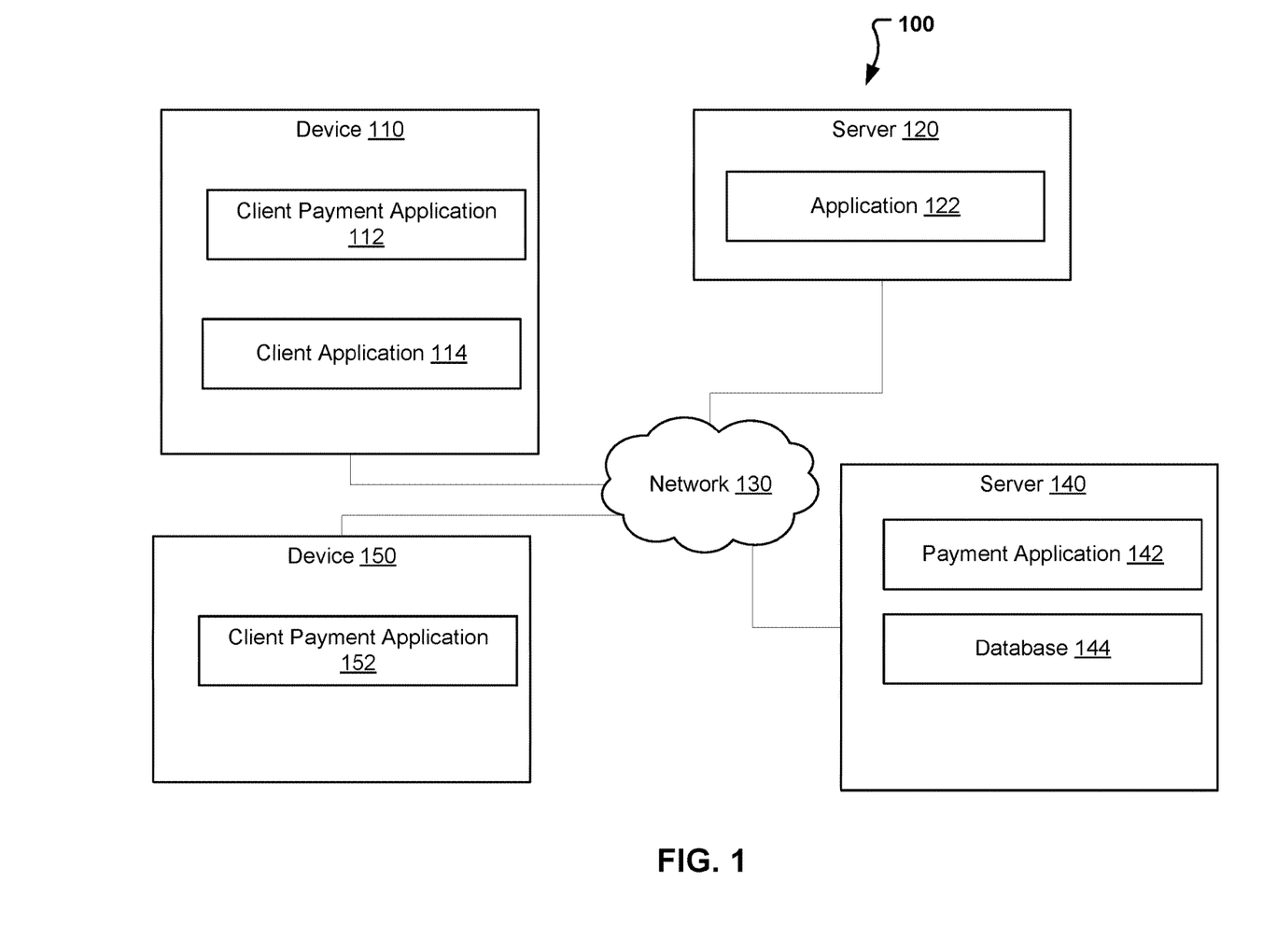
FIG. 1 illustrates a group payment system, in accordance with an embodiment.

FIG. 1 illustrates group payment system 100, in accordance with an embodiment. In the example embodiment, group payment system 100 includes device 110, server 120, server 140, and device 150 interconnected via network 130.

In the example embodiment, network 130 is the Internet, representing a worldwide collection of networks and gateways to support communications between devices connected to the Internet. Network 130 may include, for example, wired, wireless or fiber optic connections. In other embodiments, network 130 may be implemented as an intranet, a Bluetooth network, a local area network (LAN), or a wide area network (WAN). In general, network 130 can be any combination of connections and protocols that will support communications between computing devices, such as between device 110 and server 140.

In the example embodiment, server 120 includes application 122. In the example embodiment, server 120 may be a desktop computer, a laptop computer, a tablet computer, a mobile device, a handheld device, a thin client, or any other electronic device or computing system capable of receiving and sending data to and from other computing devices, such as device 110, via network 130. Although not shown, optionally, server 120 can comprise a cluster of servers executing the same software to collectively process requests as distributed by a front-end server and a load balancer. In the example embodiment, server 120 is a computing device that is optimized for the support of applications that reside on server 120, such as application 122, and for the support of network requests related to application 122. Server 120 is described in more detail with regard to the figures.

In the example embodiment, application 122 is a server-side application that is capable of responding to requests from corresponding clients-side applications. In the example embodiment, application 122 is an e-commerce application, however, in other embodiments, application 122 may be a financial application, a social media application, a merchant application, a service provider application, or another type of application. Application 122 is described in more detail with regard to the figures.

In the example embodiment, device 110 includes client payment application 112 and client application 114. In the example embodiment, device 110 may be a desktop computer, a laptop computer, a tablet computer, a mobile device, a handheld device, a thin client, or any other electronic device or computing system capable of receiving and sending data to and from other computing devices, such as server 120, via network 130. Device 110 is described in more detail with regard to the figures.

In the example embodiment, client payment application 112 is a client-side application, corresponding to the server-side payment application 142, that is capable of transmitting requests to payment application 142 and is further capable of providing received information to a user of device 110 via a user interface. In the example embodiment, client payment application 112 is a stand-alone client application, however, in other embodiments, client payment application 112 may be fully or partially integrated with client application 114. Client payment application 112 is described in more detail with regard to the figures.

In the example embodiment, client application 114 is a client-side application, corresponding to the server-side application 122, that is capable of transmitting requests to application 122 and is further capable of providing received information to a user of device 110 via a user interface. In the example embodiment, client application 114 is an e-commerce application, however, in other embodiments, application 114 may be a financial application, a social media application, a merchant application, a service provider application, or another type of application. Application 122 is described in more detail with regard to the figures.

In the example embodiment, device 150 includes client payment application 152. In the example embodiment, device 150 may be a desktop computer, a laptop computer, a tablet computer, a mobile device, a handheld device, a thin client, or any other electronic device or computing system capable of receiving and sending data to and from other computing devices, such as server 140, via network 130. Device 150 is described in more detail with regard to the figures.

In the example embodiment, client payment application 152 is a client-side application, corresponding to the server-side payment application 142, that is capable of transmitting requests to payment application 142 and is further capable of providing received information to a user of device 150 via a user interface. In the example embodiment, client payment application 152 is a stand-alone client application, however, in other embodiments, client payment application 152 may be fully or partially integrated with another application on device 150. Client payment application 152 is described in more detail with regard to the figures.

In the example embodiment, server 140 includes payment application 142 and database 144. In the example embodiment, server 140 may be a desktop computer, a laptop computer, a tablet computer, a mobile device, a handheld device, a thin client, or any other electronic device or computing system capable of receiving and sending data to and from other computing devices, such as device 110, via network 130. Furthermore, in the example embodiment, server 140 is a computing device that is optimized for the support of applications that reside on server 140, such as payment application 142. Although not shown, optionally, server 140 can comprise a cluster of servers executing the same software to collectively process requests as distributed by a front-end server and a load balancer. Server 140 is described in more detail with regard to the figures.

In the example embodiment, database 144 is a database that includes information corresponding to one or more users of a payment service provider, such as the payment service provider corresponding to payment application 142. For example, database 144 may include user financial information, user authentication information, user preferences, user connections (other users that a user may be linked to, connected with, etc.), information detailing each user's transactional history, and additional user information. Database 144 is described in more detail with regard to the figures.

In the example embodiment, payment application 142 is a server-side application, corresponding to the client-side payment applications such as client payment application 112 and client payment application 152. Payment application 142 is capable of receiving information from client payment applications and further capable of responding to requests from corresponding client payment applications. In addition, in the example embodiment, based on detecting the selection of a group payment interface element by a user, payment application 142 is capable of authenticating the user, importing purchase information, and generating one or more group payment user interfaces. Furthermore, payment application 142 is capable of determining a payment allocation for each user corresponding to the group payment, and further capable of transmitting invoices to the users associated with the group payment. In addition, based on detecting a payment made in response to an invoice, payment application 142 is capable of updating a corresponding group payment user interface. Payment application 142 is described in more detail with regard to the figures.

Furthermore, in one or more embodiments, payment application 142 may utilize an application programming interface (API) in communicating with other programs, and further in communicating with database 144.

Figure 2:
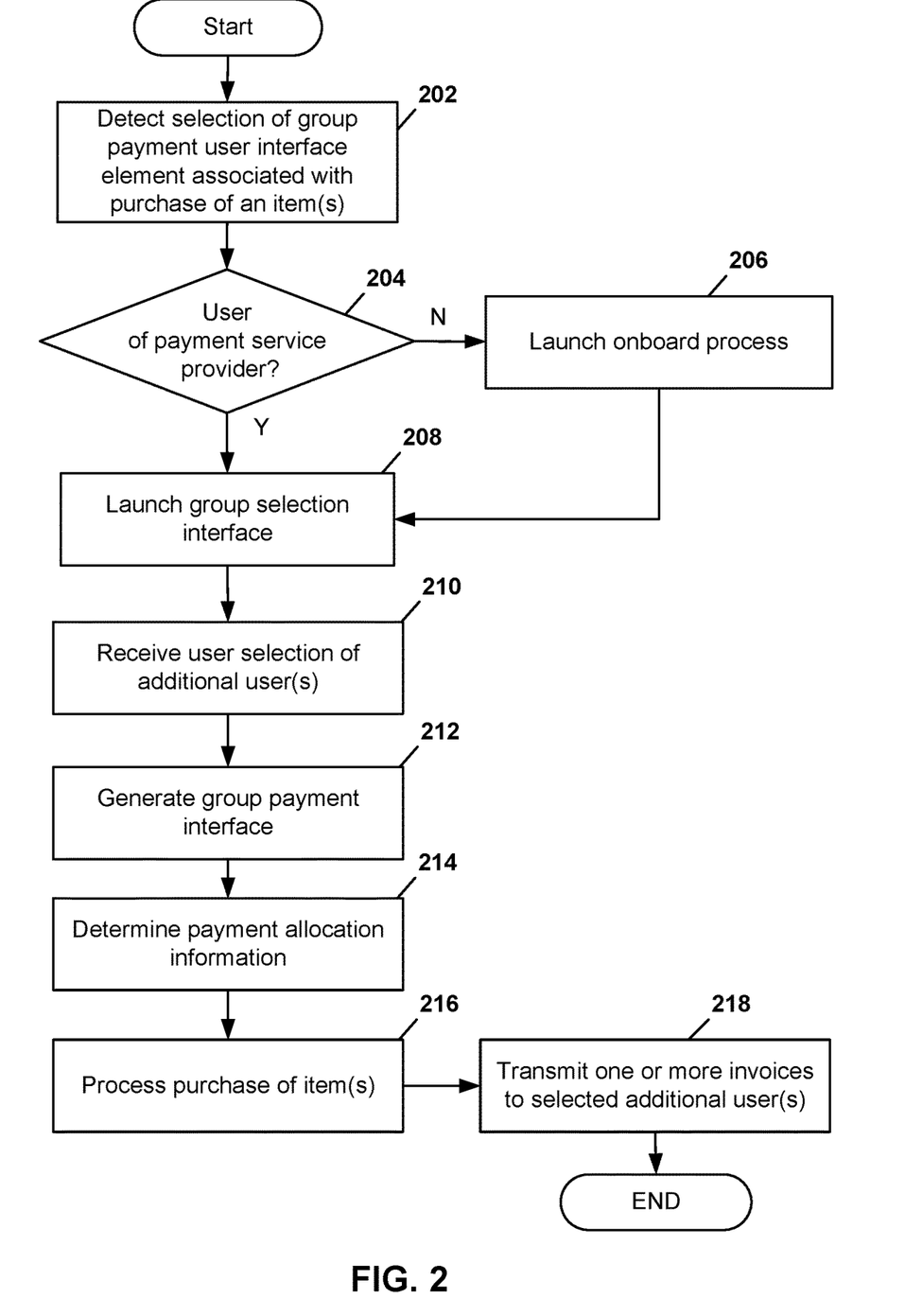
FIG. 2 is a flowchart illustrating the operations of the payment application of FIG. 1 in facilitating a group payment, in accordance with an embodiment.

FIG. 2 is a flowchart illustrating the operations of payment application 142 in facilitating a group payment, in accordance with an embodiment. In the example embodiment, a user of user device 110 may be in client application 114 for the purpose of completing a purchase. In the example embodiment, client application 114 may be a client-side application of an e-commerce application (application 122 being the server-side application), however, in other embodiments, client application 114 may be a different type of application.

In the example embodiment, payment application 142 may detect a selection of a group payment user interface element associated with the purchase of an item (or service) (step 202). In the example embodiment, a user of user device 110 may select a "group payment" user interface element or button displayed on a checkout interface of client application 114, with the user interface element being associated with the payment service provider corresponding to payment application 142. For example, the payment service provider may serve as a payment option or payment facilitator for users of application 122 (or the merchant/service provider associated with application 122) and may therefore provide custom logic to the merchant/service provider in order to provide a "group payment" user interface element within application 122. Upon selection of the "group payment" user interface element, the checkout flow may be taken over by payment application 142 and redirected to an interface corresponding to payment application 142. In other embodiments, upon selection of the "group payment" user interface element, rather than redirecting, payment application 142 may take over the checkout flow within an interface corresponding to client application 114. Furthermore, in the example embodiment, upon selection of the "group payment" user interface element, information corresponding to the purchase may also be transmitted (by client application 114 or application 122) to payment application 142. For example, the item/service to be purchased, the purchase price, location corresponding to the item/service, a date/time of the purchase, a date/time corresponding to the service (or event), a merchant identifier corresponding to the item/service, and additional purchase information may be transmitted to payment application 142.

In addition, in one or more embodiments, the "group payment" user interface element may be a "smart" user interface element/smart button, and therefore, may be rendered based on an analysis of the transaction. For example, if the transaction/purchase corresponds to a certain category of purchase (such as an event), then the "group payment" user interface element may be rendered. In another example, whether or not the "group payment" user interface element is rendered may be dependent on a merchant agreement with the payment service provider.

In the example embodiment, upon detection that the "group payment" user interface has been selected by the user of user device 110, payment application 142 may determine if the user of user device 110 is a user of the payment service provider corresponding to payment application 142 (decision 204). In the example embodiment, payment application 142 may request authentication credentials from the user of user device 110 by causing client payment application 112 to launch and requesting the authentication credentials via client payment application 112. In other embodiments, payment application 142 may request authentication credentials from the user of user device 110 via an interface corresponding to client application 114. In the example embodiment, after receiving the authentication credentials, payment application 142 may compare the received authentication credentials against user information contained in database 144 in order to determine if the user of user device 110 is a registered user of the payment service provider corresponding to payment application 142.

If payment application 142 determines that the user of user device 110 is not a user of the payment service provider corresponding to payment application 142 (decision 204, "NO" branch), payment application 142 may launch an onboarding process via client payment application 112 on user device 110 (step 206). In the example embodiment, payment application 142 may utilize client payment application 112 to provide an interface to the user of user device 110 to capture one or more pieces of user information in order to onboard the user and create a user account with the payment service provider corresponding to payment application 142. Furthermore, in one or more embodiments, payment application 142 may analyze the user information corresponding to the purchase (received from client application 114 or application 122) in order to auto-fill certain portions of the onboarding process. In certain embodiments, payment application 142 may filter out portions of the onboarding questions or onboard the user without requiring additional information based on determining that the received user information corresponding to the purchase provides sufficient information.

If payment application 142 determines that the user of user device 110 is a user of the payment service provider corresponding to payment application 142 (decision 204, "YES" branch) or if the user of user device 110 has been onboarded (based on step 206), payment application 142 launches a group (or user) selection interface via client payment application 112 (step 208). In the example embodiment, the group selection interface provides an interface where the user of user device 110 can select one or more users of the payment service provider corresponding to payment application 142 to be part of the group purchase. In the example embodiment, payment application 142 may access database 144 and identify other users of the payment service provider that are associated with the user of user device 110 (such as phone contacts, social media friends, linked users within the payment service provider system, etc.) and may provide the identified other users as options that may be selected to be part of the group purchase.

Furthermore, in one or more embodiments, payment application 142 may provide additional selectable user interface elements on the group selection interface, such as a "suggested" selection, or one or more "preset" selections. In these one or more embodiments, payment application 142 may provide the option for the user of user device 110 to have "preset" user interface elements that correspond to one or more users (that the user may input). Furthermore, payment application 142 may additionally suggest that a user of user device 110 associate a group of other users with a "preset" user interface element based on the number of group transactions that includes the group of other users and the user of user device 110 exceeding a threshold level. In other embodiments, payment application 142 may suggest that a user of user device 110 associate a group of other users with a "preset" user interface element based on a number of interactions between the users (the group of other users plus the user of user device 110) exceeding a threshold amount or the frequency of interactions exceeding a threshold frequency. In the example embodiment, "preset" options provides a quick and easy method for selecting the appropriate users for a group purchase, particularly in situations where the user of user device 110 transacts with certain users on a regular basis. In these one or more embodiments, payment application 142 may determine one or more users to associate with the "suggested" user interface element based on analyzing previous activity associated with the user of user device 110, and further based on information associated with the current group purchase. In addition, payment application 142 may determine one or more users to associate with the "suggested" user interface element based on the current user selection of one or more users to associate with the group purchase. The "preset" and "suggested" user interface elements are depicted and discussed in further detail with respect to FIG. 5.

In the example embodiment, payment application 142 may receive, via the group selection interface, a selection, from the user of user device 110, of one or more additional users to associate with the group purchase (step 210).

Payment application 142 may then generate and provide (via client payment application 112) a group payment interface based on the received selection of one or more additional users (step 212). In the example embodiment, the group payment interface may also include details corresponding to the purchase, such as the item/service to be purchased, the purchase price, location corresponding to the item/service, a date/time of the purchase, a date/time corresponding to the service (or event), and a merchant identifier corresponding to the item/service.

Furthermore, the group payment interface may include a "split evenly" user interface element as well as a "suggested" user interface element. The "split evenly" user interface element, if selected, evenly distributes the purchase price between the users associated with the group purchase (including the user of user device 110). The "suggested" user interface element, if selected, may distribute the purchase price between the users associated with the group purchase, but may also take into account outstanding invoices associated with members of the group. For example, if a first user still owes the user of user device 110 $10 for a previous group purchase, upon selection of the "suggested" user interface element, $10 may be added to the purchase amount associated with the first user. In the example embodiment, payment application 142 may, by default, distribute the purchase price between the users associated with the group purchase according to the "suggested" amounts associated with each user (taking into account outstanding invoices), and therefore, may be taken into account in the initial group payment interface presented to the user of user device 110. In this example embodiment, if there are no outstanding invoices between the users associated with the group purchase, the initial group payment interface may depict the purchase price split evenly between the users. In other embodiments, the initial group payment interface may not allocate the purchase price of the group purchase between the users until an option is selected by the user of user device 110.

Additionally, in the example embodiment, a user interface element may be associated with each user of the users associated with the group purchase, which allows the user of user device 110 to input a custom allocation amount for an associated user. The group payment interface is depicted and described in additional detail with regard to FIGS. 6 and 7.

In the example embodiment, payment application 142 may determine the appropriate payment allocation for each user of the users associated with the group purchase based on input provided by the user of user device 110 (step 214). In the example embodiment, the payment allocation may be determined based on the user of user device 110 selected a user interface element corresponding to confirmation of the information presented by the group payment interface. Furthermore, in the example embodiment, upon receiving a confirmation to proceed from the user of user device 110, payment application 142 may process or cause the payment for the group purchase to be processed (step 216). In the example embodiment, payment application 142 may utilize stored financial information associated with the user of user device 110 or financial information input by the user of user device 110 to process the payment for the group purchase. In addition, in the example embodiment, payment application 142 may transmit one or more invoices to each of the users associated with the group purchase (step 218). In the example embodiment, the invoices may include information associated with the group purchase as well as information associated with an amount of the group purchase allocated to each specific user. Furthermore, in one or more embodiment, payment application 142 may re-transmit the invoice or a request for payment to each user on a periodic basis until the corresponding payment is made.

Figure 3:
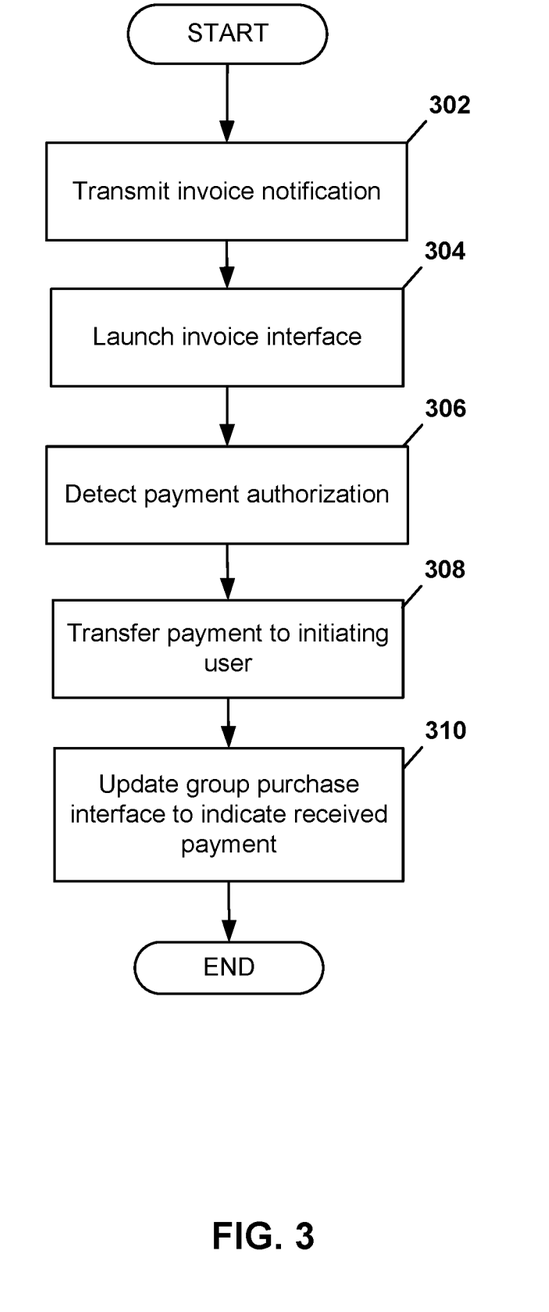
FIG. 3 is a flowchart illustrating the operations of the payment application of FIG. 1 in updating the group payment interface based on detection of received payment, in accordance with an embodiment.

FIG. 3 is a flowchart illustrating the operations of payment application 142 in updating the group payment interface based on detection of received payment, in accordance with an embodiment. In the example embodiment, payment application 142 transmits an invoice notification to a user device associated with a group payment, such as device 150 (step 302). In the example embodiment, the user of user device 150 may be selected by the user of user device 110 to be part of a group purchase. The invoice notification may be received by client payment application 152 on device 150 and presented to the user of user device 150 via an alert or notification.

In the example embodiment, in response to detection of a selection, by the user of user device 150 of a link or a user interface element associated with the invoice notification, payment application 142 may utilize client payment application 152 to launch an invoice interface on user device 150 (step 304). In the example embodiment, payment application 142 provide information associated with the group purchase as well as information associated with an amount of the group purchase allocated to the user of user device 150 within the invoice interface. Furthermore, a user interface element may be provided for the user of user 150 to confirm the purchase and initiate transfer of the funds to an account of the requesting user (in this example, the user of user device 110).

In the example embodiment, payment application 142 may detect a payment authorization within the provided invoice interface (step 306). In the example embodiment, payment application 142 may detect that the user of user device 150 has authorized a payment to be made to the user of user device 110, via the provided invoice interface. Based on receiving authorization for the payment, payment application 142 may transfer the payment to an account associated with the initiating user (i.e., the user of user device 110) (step 308).

In the example embodiment, based on performing the transfer to the user of user device 110, payment application 142 updates a group purchase interface to reflect the payment and may also provide a notification to the user of user device 110 that the payment has been made (step 310). In the example embodiment, the user of user device 110 may log into client payment application 112 and view the updated group purchase interface (which may be further updated by payment application 142 as payments are authorized and transferred from the other users associated with the group purchase). Furthermore, the group purchase interface may include information corresponding to the users associated with the purchase, the outstanding balance of each of the payment allocations corresponding to each of the users associated with the purchase and may further have information corresponding to the group purchase. In one or more embodiments, the other users associated with the group purchase may also be provided access to view the group purchase interface (and also may receive updates to the group purchase interface as described above).

In other embodiments, rather than a user, such as the user of user device 110 provided the initial funds for the group purchase, payment application 142 may provide a money pool that may be usable by each transaction group. In these other embodiments, the purchase initiator (i.e., the user of user device 110), may select the "group purchase" option, which causes payment application 142 to utilize the money pool (corresponding to the group of users associated with the group purchase) to pay for the group purchase. Furthermore, based on the group purchase being completed, payment application 142 may transfer an allocated payment amount associated with the purchase initiator to the money pool. In addition, payment application may identify the allocated amounts associated with each of the other users associated with the group purchase and transmit one or more invoices to each of the other users associated with the group purchase. In one or more embodiments, if payments are not made within a threshold amount of time after the invoices are transmitted, payment application 142 may pull each respective allocated amount from the payment service provider accounts associated with each of the other users associated with the group purchase and deposit the funds into the money pool. Furthermore, after a threshold period of time has passed from the group purchase time/date, payment application 142 may sweep the money from the money pool to reimburse the funds that were provided to front the group purchase. In further embodiments, rather than first depositing money received or pulled from the users associated with the group purchase into the money pool, payment application 142 may transfer the funds directly into an account associated with payment application 142.

Figure 4:
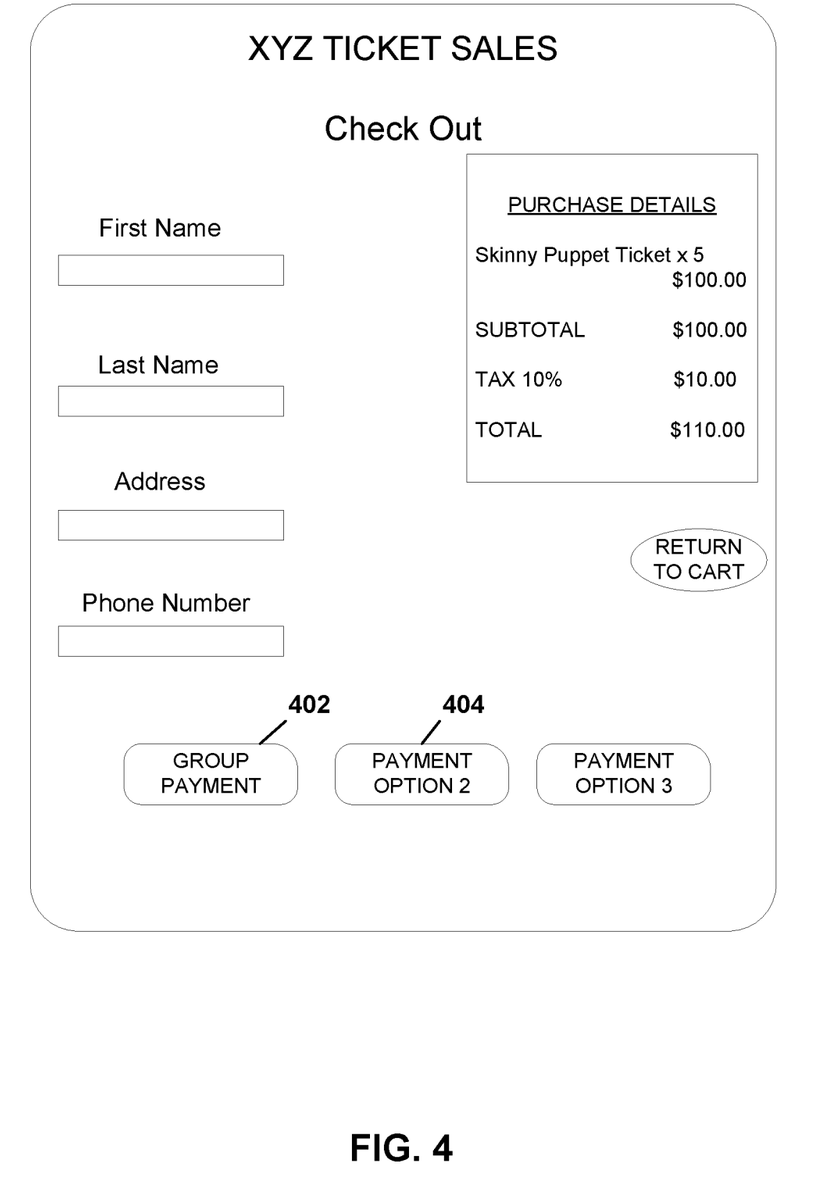
FIG. 4 is a depiction of a merchant interface that includes a group payment option for a purchase, in accordance with an embodiment.

FIG. 4 is a depiction of a merchant interface that includes a group payment option for a purchase, in accordance with an embodiment. In the example embodiment, FIG. 4 depicts a merchant interface that includes multiple payment options, such as payment option 402 and payment option 404. Furthermore, in the example embodiment, payment option 402 represents a "group payment" user interface element as described above.

Figure 5:
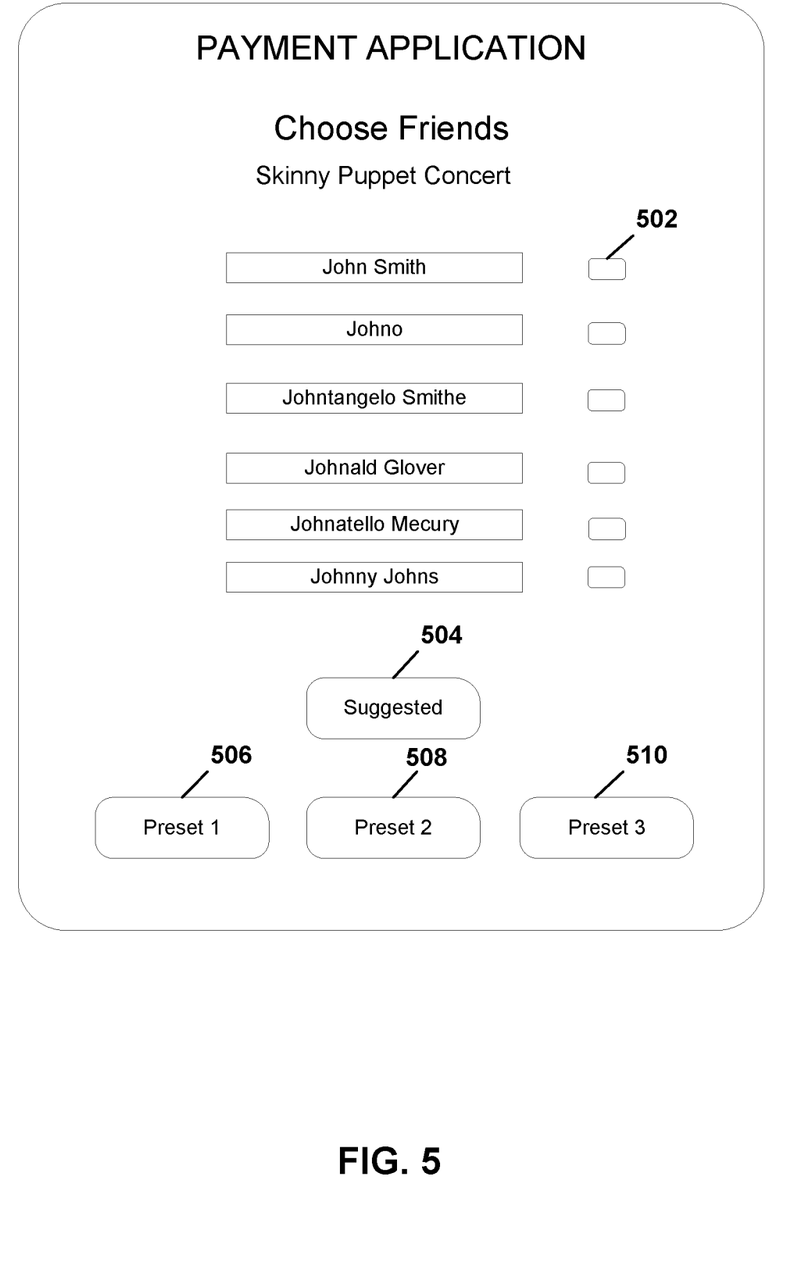
FIG. 5 is a depiction of a group selection interface that allows for the selection of one or more users, in accordance with an embodiment.

FIG. 5 is a depiction of a group selection interface that allows for the selection of one or more users, in accordance with an embodiment. In the example embodiment, payment application 142 includes an interface that provides for the selection of one or more users by way of selection an associated user interface element. For example, element 502 is a user interface element that corresponds with the user "John Smith". In the example embodiment, the user of user device 110 may select "John Smith" to be part of the group purchase detailed in FIG. 4 by selecting element 502. Furthermore, the group selection interface depicted in FIG. 5 also includes additional user interface elements such as suggested element 504, preset element 506, preset element 508, and preset element 510. In the example embodiment, preset element 506, 508, and 510 may correspond to one or more users that are preset by the user of user device 110. In other embodiments, payment application 142 may provide suggestions as to group of users that the user of user device 110 should associate with one or more preset elements based on analyzing past group transactions, past group interactions, and further based on the amount/frequency of the past group transactions/interactions. For example, if "John Smith" and "Johno" perform group purchases with the user of user device 110 on a weekly basis, payment application 142 may suggest that preset 506 be associated with "John Smith" and "Johno". Furthermore, payment application 142 may make the same suggestion on accounts corresponding to "John Smith" and "Johno".

In the example embodiment, suggested element 504 corresponds to a group of users that payment application 142 predicts may be associated with the current group purchase. Payment application 142 may predict the associated users based on analyzing previous transactional history, previous interactions, based on information corresponding to each contact (likes/dislikes, interests, etc.), analyzing location information of contacts associated with the transaction initiator, based on transactional information associated with the current group transaction, user preference information, social media information, and additional user information. For example, payment application 142 may predict that a current group transaction is associated with "John Smith" and "Johnald Glover" based on a location of each user being within a merchant location at the time of initiation of the group purchase. In another example, payment application 142 may predict that a current group transaction (tickets to watch a "Skinny Puppet" concert) is associated with "John Smith" and "Johnald Glover" based on each user having previously purchased tickets for "Skinny Puppet" concerts in the past.

Figure 6:
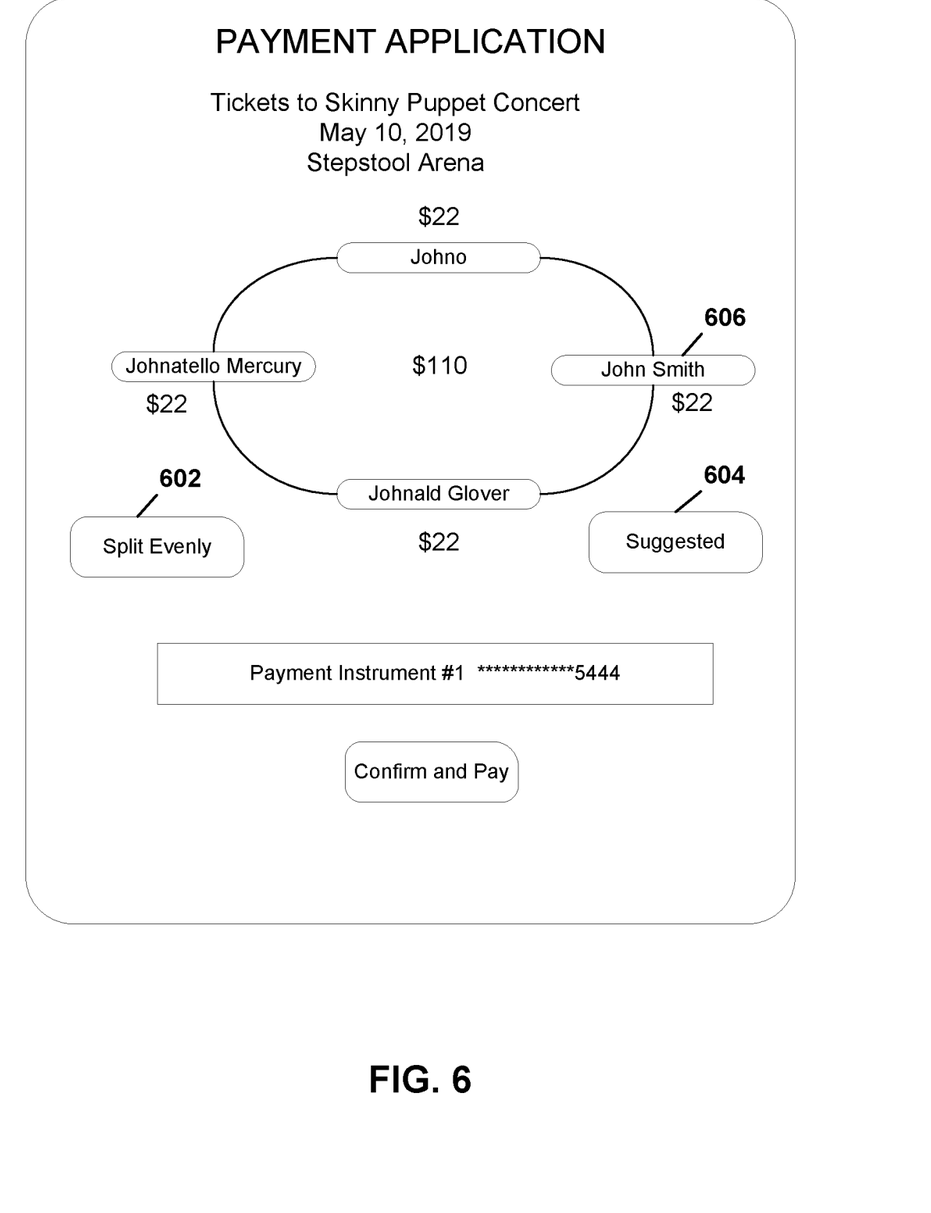
FIG. 6 is a depiction of a group payment interface that allows for the adjustment of payment allocation amounts, in accordance with an embodiment.

FIG. 6 is a depiction of a group payment interface that allows for the adjustment of payment allocation amounts, in accordance with an embodiment. In the example embodiment, the group payment interface in FIG. 6 depicts a payment allocation where an initiating user (such as the user of user device 110) has chosen element 602 which corresponds to splitting a group purchase evenly amongst the associated users. In one or more embodiments, payment application 142 may default to an even split allocation unless another option is chosen, therefore, in these one or more embodiments, the user of user device 110 may not be required to select element 602 to achieve this allocation type. Furthermore, each associated user may be associated with a selectable element, such as element 606 which may allow the user of user device 110 to adjust the allocated amount to a custom amount (via input).

Figure 7:
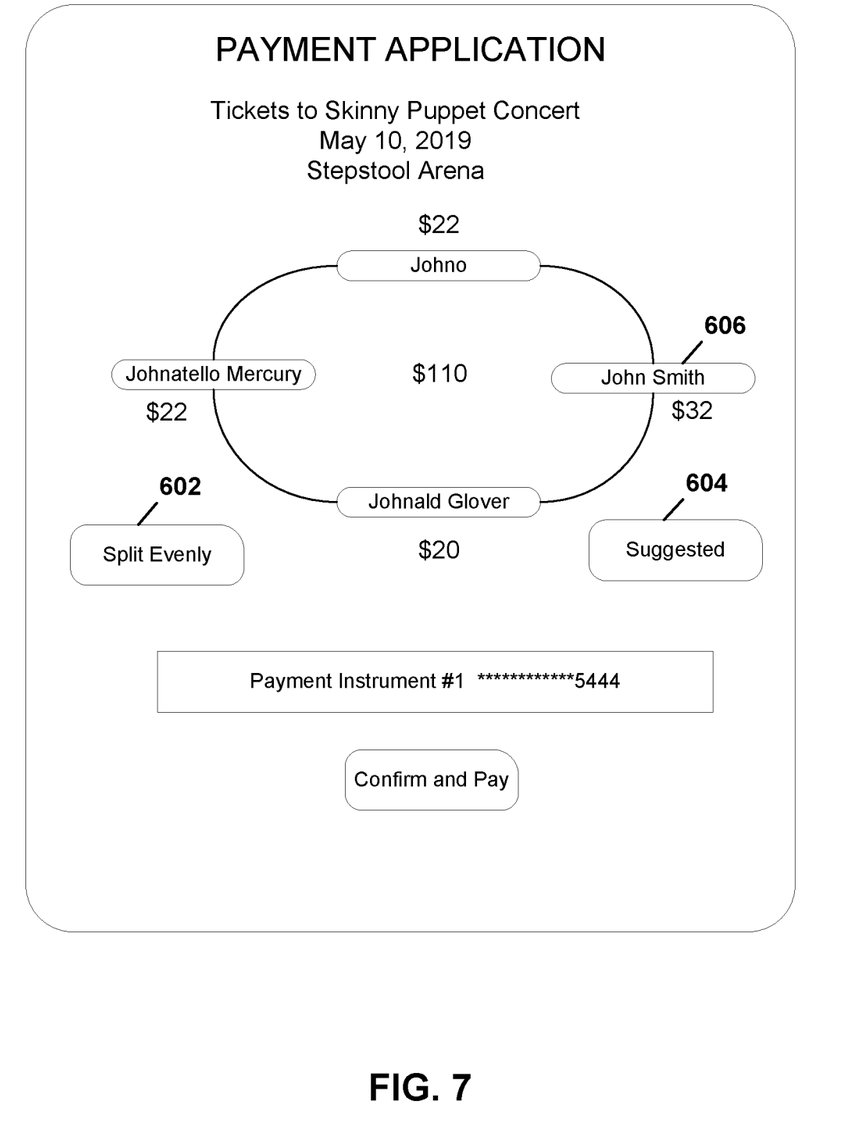
FIG. 7 is a second depiction of the group payment interface that allows for the adjustment of payment allocation amounts, in accordance with an embodiment.

FIG. 7 is a second depiction of the group payment interface that allows for the adjustment of payment allocation amounts, in accordance with an embodiment. In the example embodiment, the group payment interface in FIG. 7 depicts a payment allocation where an initiating user (such as the user of user device 110) has chosen element 604 which corresponds to splitting a group purchase based on a suggested allocation determined by payment application 142. In the example embodiment, payment application 142 may identify if there are any outstanding invoices between the users within the group, and based on any identified outstanding invoices, payment application 142 may adjust the allocated amount associated with one or more users. For example, if payment application 142 determines that "John Smith" still owes the user of user device 110 $10 based on a previous transaction or purchase (such as a previous group purchase), payment application 142 may adjust the allocated amount associated with "John Smith" to $32 as depicted. Furthermore, if payment application 142 determines that the user of user device 110 owes "Johnald Glover" $2 based on a previous transaction or purchase, payment application 142 may adjust the allocated amount associated with "Johnald Glover" to $20. In the example embodiment, payment application 142 may refer to a transactional database, such as database 144 to access transactional information and identify outstanding invoices and payments due to or from each user. Furthermore, in the example embodiment, upon confirmation of the suggested payment allocation by the user of user device 110, payment application 142 may remove or adjust previous invoices based on the amount applied to the group purchase. In one or more embodiments, payment application 142 may default to the suggested allocation unless there are no outstanding invoices within the group of users, in which case, the default may be to split the purchase evenly amongst the group of users.

In addition, in one or more embodiments, if a group purchase is made and a refund is subsequently requested by the user of user device 110. Payment application 142 may refer to accepted payment allocation scheme and further may reference payment information to determine whether each invoiced user has provided payment to the user of user device 110. Based on the accepted payment allocation and whether each invoiced user has provided the appropriate payment, payment application 142 may determine a refund allocation scheme. For example, referring to FIG. 6, if each user associated with the group purchase has paid the invoiced amount to the user of user device 110, payment application 142 may refund each user's account with $22. However, if each user except for "Johno" has paid the invoiced amount, payment application 142 may refund each user, except for "Johno", $22 and refund the user of user device 110 $44. Furthermore, payment application 142 may remove/cancel the invoice sent from the user of user device 110 to "Johno".

Furthermore, in one or more embodiments, based on the group purchases/transactions, a user's interests, purchases/transactions associated with linked users, items that linked are interested in, and metadata associated with products purchased by a user or linked user, payment application 142 may provide users with product suggestions. In addition, payment application 142 may provide a shortcut or link to a group payment interface corresponding to a purchase of the product for linked users identified as corresponding to the product.

The foregoing description of various embodiments of the present disclosure has been presented for purposes of illustration and description. It is not intended to be exhaustive nor to limit the disclosure to the precise form disclosed. Many modifications and variations are possible. Such modifications and variations that may be apparent to a person skilled in the art of the disclosure are intended to be included within the scope of the disclosure as defined by the accompanying claims.

Figure 8:
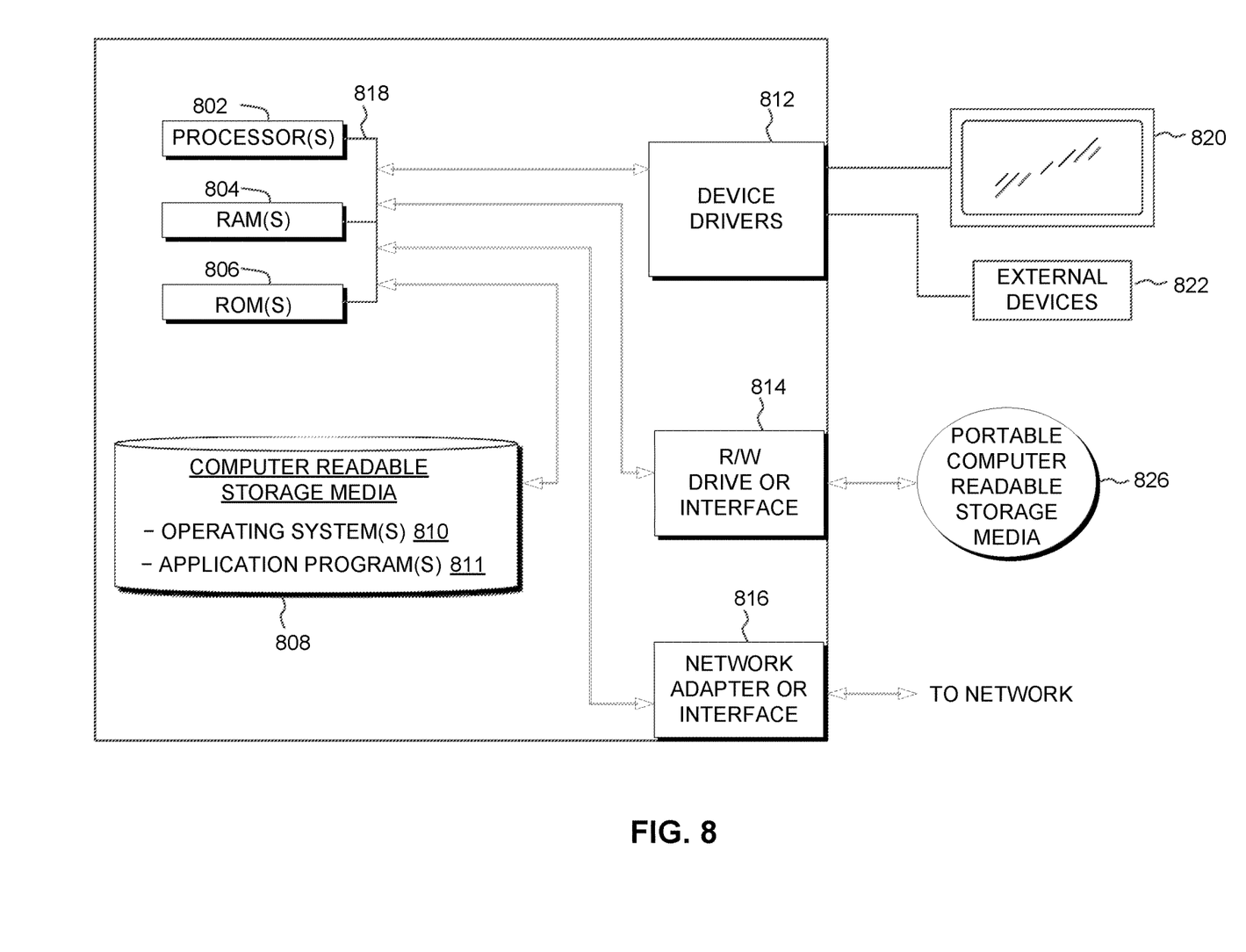
FIG. 8 is a block diagram depicting the hardware components of the autoencoder system of FIG. 1, in accordance with an embodiment.

FIG. 8 depicts a block diagram of components of computing devices contained in group payment system 100 of FIG. 1, in accordance with an embodiment. It should be appreciated that FIG. 8 provides only an illustration of one implementation and does not imply any limitations with regard to the environments in which different embodiments may be implemented. Many modifications to the depicted environment may be made.

Computing devices may include one or more processors 802, one or more computer-readable RAMs 804, one or more computer-readable ROMs 806, one or more computer readable storage media 808, device drivers 812, read/write drive or interface 814, network adapter or interface 816, all interconnected over a communications fabric 818. Communications fabric 818 may be implemented with any architecture designed for passing data and/or control information between processors (such as microprocessors, communications and network processors, etc.), system memory, peripheral devices, and any other hardware components within a system.

One or more operating systems 810, and one or more application programs 811, for example, payment application 142, are stored on one or more of the computer readable storage media 808 for execution by one or more of the processors 802 and by utilizing one or more of the respective RAMs 804 (which typically include cache memory). In the illustrated embodiment, each of the computer readable storage media 808 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Computing devices may also include a R/W drive or interface 814 to read from and write to one or more portable computer readable storage media 826. Application programs 811 on the computing devices may be stored on one or more of the portable computer readable storage media 826, read via the respective R/W drive or interface 814 and loaded into the respective computer readable storage media 808.

Computing devices may also include a network adapter or interface 816, such as a TCP/IP adapter card or wireless communication adapter (such as a 4G wireless communication adapter using OFDMA technology). Application programs 811 on the computing devices may be downloaded to the computing devices from an external computer or external storage device via a network (for example, the Internet, a local area network or other wide area network or wireless network) and network adapter or interface 816. From the network adapter or interface 816, the programs may be loaded onto computer readable storage media 808. The network may comprise copper wires, optical fibers, wireless transmission, routers, firewalls, switches, gateway computers and/or edge servers.

Computing devices may also include a display screen 820, and external devices 822, which may include, for example a keyboard, a computer mouse and/or touchpad. Device drivers 812 interface to display screen 820 for imaging, to external devices 822, and/or to display screen 820 for pressure sensing of alphanumeric character entry and user selections. The device drivers 812, R/W drive or interface 814 and network adapter or interface 816 may comprise hardware and software (stored on computer readable storage media 808 and/or ROM 806).

The programs described herein are identified based upon the application for which they are implemented in a specific embodiment. However, it should be appreciated that any particular program nomenclature herein is used merely for convenience, and thus the disclosure should not be limited to use solely in any specific application identified and/or implied by such nomenclature.

Based on the foregoing, a computer system, method, and computer program product have been disclosed. However, numerous modifications and substitutions can be made without deviating from the scope of the present disclosure. Therefore, the various embodiments have been disclosed by way of example and not limitation.

Various embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer system, comprising:
one or more computer-readable memories storing program instructions; and
one or more processors configured to execute the program instructions to cause the computer system to perform operations comprising:
in response to detecting a selection, by a first user, of a first payment user interface element displayed on a merchant interface corresponding to a group purchase, launching a user selection user interface, wherein the user selection user interface corresponds to a payment service mobile application, and wherein the user selection user interface includes user selection interface elements that correspond to a plurality of users associated with the first user;
detecting a selection of the user selection interface elements that correspond to selected users participating in the group purchase with the first user;
launching a group payment user interface in the payment service mobile application, wherein the group payment user interface includes adjustable payment allocation user interface elements that correspond to a portion of the group purchase assigned to each of the selected users;

determining a first payment allocation plan for the group purchase based on one or more outstanding balances between users of the group that correspond to one or more previous transactions, prior to the group purchase;

updating the adjustable payment allocation user interface elements with assigned portions of the group purchase based on the one or more outstanding balances between the users of the group in the determined first payment allocation plan; and in response to detecting a confirmation of the first payment allocation plan, processing a payment for the group purchase, wherein the processing the payment for the group purchase includes transmitting invoices to the selected users according to the first payment allocation plan.

2. The computer system of claim 1, the operations further comprising:

analyzing information corresponding to the group purchase to predict that a second user and a third user correspond to the group purchase; and associating the second user and the third user with a second user selection interface element and third user selection interface element, respectively.

3. The computer system of claim 2, wherein the analyzing the information corresponding to the group purchase to predict that the second user and the third user correspond to the group purchase further includes analyzing a previous transactional history corresponding to the second user and a previous transactional history corresponding to the third user.

4. The computer system of claim 1, the operations further comprising:

receiving input from the first user that includes a request to create a preset user group that includes a second user and a third user; and associating the second user and the third user with a preset user selection interface element.

5. The computer system of claim 1, wherein a first payment allocation user interface element of the adjustable payment allocation user interface elements corresponds to a second user of the plurality of users, and wherein a selection of the first payment allocation user interface element, by the first user, enables a payment allocation associated with the second user to be adjusted.

6. The computer system of claim 1, wherein the determining the first payment allocation plan includes:

analyzing the one or more previous transactions; and adjusting the first payment allocation plan based on the one or more outstanding balances that correspond to the one or more previous transactions among the users of the group.

7. The computer system of claim 1, the operations further comprising:

detecting a selection of a second payment allocation user interface element of the group payment user interface; and in response to the detecting the selection of the second payment allocation user interface element, allocating the group purchase evenly among the users of the group.

8. A non-transitory computer-readable medium storing computer-executable instructions, that in response to execution by one or more hardware processors, causes the one or more hardware processors to perform operations comprising:

in response to detecting a selection, by a first user, of a first payment user interface element displayed on a merchant interface corresponding to a group purchase, launching a user selection user interface, wherein the user selection user interface corresponds to a payment service mobile application, and wherein the user selection user interface includes user selection interface elements that correspond to a plurality of users associated with the first user;

detecting a selection of the user selection interface elements that correspond to selected users participating in the group purchase with the first user;

launching a group payment user interface in the payment service mobile application, wherein the group payment user interface includes adjustable payment allocation user interface elements that correspond to a portion of the group purchase assigned to each of the selected users;

determining a first payment allocation plan for the group purchase based on one or more outstanding balances between users of the group that correspond to one or more previous transactions, prior to the group purchase;

updating the adjustable payment allocation user interface elements with assigned portions of the group purchase based on the one or more outstanding balances between the users of the group in the determined first payment allocation plan; and in response to detecting a confirmation of the first payment allocation plan, processing a payment for the group purchase, wherein the processing the payment for the group purchase includes transmitting invoices to the selected users according to the first payment allocation plan.

9. The non-transitory computer-readable medium of claim 8, the operations further comprising:

analyzing information corresponding to the group purchase and analyzing a previous transactional history corresponding to a second user and a third user to predict that the second user and the third user correspond to the group purchase; and associating the second user and the third user with the user selection user interface.

10. The non-transitory computer-readable medium of claim 8, the operations further comprising:

determining a payment has been made in association with a first invoice of the one or more invoices; and updating the group payment user interface to indicate that the payment has been made.

11. The non-transitory computer-readable medium of claim 8, the operations further comprising:

receiving input from the first user that includes a request to create a preset user group that includes a second user and a third user; and associating the second user and the third user with a preset user selection interface element.

12. The non-transitory computer-readable medium of claim 8, wherein a first payment allocation user interface element of the adjustable payment allocation user interface elements corresponds to a second user of the group of users, and wherein a selection of the first payment allocation user interface element, by the first user, enables a payment allocation associated with the second user to be adjusted.

13. The non-transitory computer-readable medium of claim 8, wherein the determining the first payment allocation plan includes:

analyzing the one or more previous transactions; and adjusting the first payment allocation plan based on the one or more outstanding balances that correspond to the one or more previous transactions.

14. A method, comprising:

in response to detecting a selection, by a first user, of a first payment user interface element displayed on a merchant interface corresponding to a group purchase, launching, by a computer system, a user selection user interface, wherein the user selection user interface corresponds to a payment service mobile application, and wherein the user selection user interface provides user selection interface elements that correspond to one or more users associated with the first user;

detecting a selection of the user interface elements that correspond to selected users participating in the group purchase with the first user;

launching, by the computer system, a group payment user interface in the payment service mobile application, wherein the group payment user interface includes adjustable payment allocation user interface elements that correspond to a portion of the group purchase assigned to each of the selected users;

determining a first payment allocation plan for the group purchase based on one or more outstanding balances between users of the group that correspond to one or more previous transactions, prior to the group purchase;

updating the adjustable payment allocation user interface elements with assigned portions of the group purchase based on the one or more outstanding balances between the users of the group in the determined first payment allocation plan; and in response to detecting a confirmation of the first payment allocation plan, processing, by the computer system, a payment for the group purchase, wherein the processing the payment for the group purchase includes transmitting invoices to the selected users according to the first payment allocation plan.

15. The method of claim 14, further comprising:

determining, by the computer system, a payment has been made in association with a first invoice of the invoices; and updating, by the computer system, the group payment user interface corresponding to the group purchase to indicate that the payment has been made.

16. The method of claim 14, further comprising analyzing, by the computer system, a previous transactional history corresponding to a second user;

predicting that the second user participated in the group purchase; and associating the second user with one of the user selection interface elements in the user selection user interface.

17. The method of claim 14, further comprising:

receiving input from the first user that includes a request to create a preset user group that includes a second user and a third user; and associating the second user and the third user with a second user selection interface element.

18. The method of claim 14, wherein a first payment allocation user interface element of the adjustable payment allocation user interface elements corresponds to a second user, and wherein a selection of the first payment allocation user interface element, by the first user, enables a payment allocation associated with the second user to be adjusted.

19. The method of claim 14, wherein the determining the first payment allocation plan includes:

analyzing the one or more previous transactions; and adjusting the first payment allocation plan based on the one or more outstanding balances that correspond to the one or more previous transactions.

20. The method of claim 14, further comprising:

detecting a selection of a payment allocation user interface element of the group payment user interface; and in response to the detecting the selection of the payment allocation user interface element, allocating the group purchase evenly among the users of the group.

\* \* \* \* \*